US011431908B2

(12) United States Patent
Hada

(10) Patent No.: US 11,431,908 B2
(45) Date of Patent: Aug. 30, 2022

(54) IMAGING CONTROL APPARATUS, CONTROL METHOD OF THE SAME, AND STORAGE MEDIUM

(71) Applicant: CANON KABUSHIKI KAISHA, Tokyo (JP)

(72) Inventor: Tetsuya Hada, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 136 days.

(21) Appl. No.: 17/070,479

(22) Filed: Oct. 14, 2020

(65) Prior Publication Data

US 2021/0127070 A1 Apr. 29, 2021

(30) Foreign Application Priority Data

Oct. 23, 2019 (JP) ............................ JP2019-192912

(51) Int. Cl.
*H04N 5/232* (2006.01)
*H04N 7/18* (2006.01)

(52) U.S. Cl.
CPC ....... *H04N 5/232941* (2018.08); *H04N 7/183* (2013.01)

(58) Field of Classification Search
None
See application file for complete search history.

(56) References Cited

U.S. PATENT DOCUMENTS

2006/0238625 A1* 10/2006 Sasaki .............. H04N 5/232933 348/231.3

FOREIGN PATENT DOCUMENTS

JP 2004-282399 A 10/2004

* cited by examiner

*Primary Examiner* — Mark T Monk
(74) *Attorney, Agent, or Firm* — Canon U.S.A., Inc. IP Division

(57) ABSTRACT

An imaging control apparatus includes a setting unit configured to set a time of a self-timer, a control unit configured to control image capturing to be performed upon a lapse of the time set by the setting unit from when an image capturing instruction is issued, and a display control unit configured to control a count display to be displayed with a first size in a case where the time set by the setting unit is equal to or larger than a first predetermined time, and to control the count display to be displayed with a second size smaller than the first size in a case where the time set by the setting unit is smaller than the first predetermined time.

12 Claims, 7 Drawing Sheets

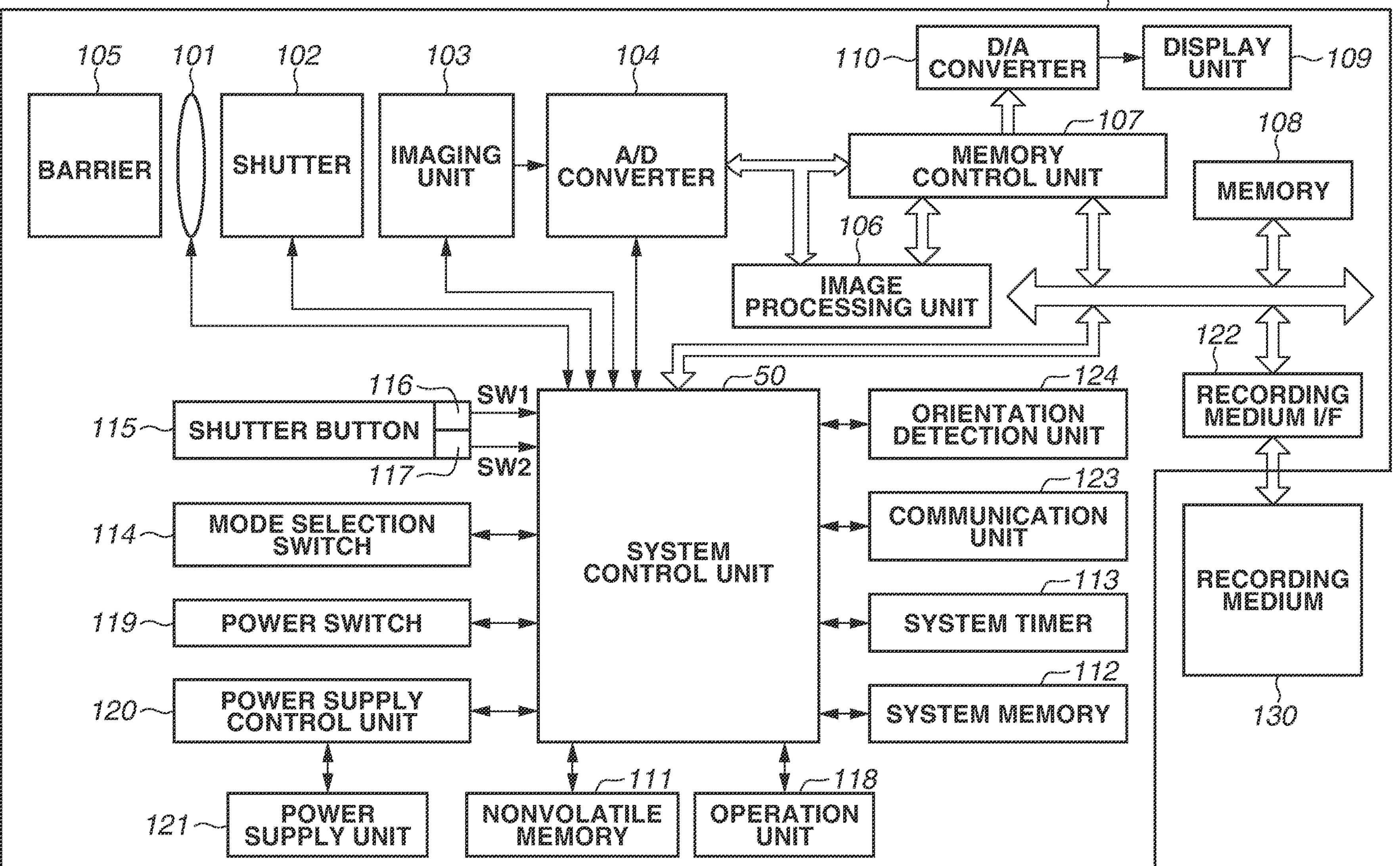
FIG.1A
100
105
BARRIER
101
102
SHUTTER
103
IMAGING UNIT
104
A/D CONVERTER
110
D/A CONVERTER
DISPLAY UNIT
109
107
MEMORY CONTROL UNIT
108
MEMORY
106
IMAGE PROCESSING UNIT
122
RECORDING MEDIUM I/F
RECORDING MEDIUM
130
50
SYSTEM CONTROL UNIT
116
SW1
115
SHUTTER BUTTON
117
SW2
114
MODE SELECTION SWITCH
119
POWER SWITCH
120
POWER SUPPLY CONTROL UNIT
121
POWER SUPPLY UNIT
NONVOLATILE MEMORY
111
OPERATION UNIT
118
124
ORIENTATION DETECTION UNIT
123
COMMUNICATION UNIT
113
SYSTEM TIMER
112
SYSTEM MEMORY

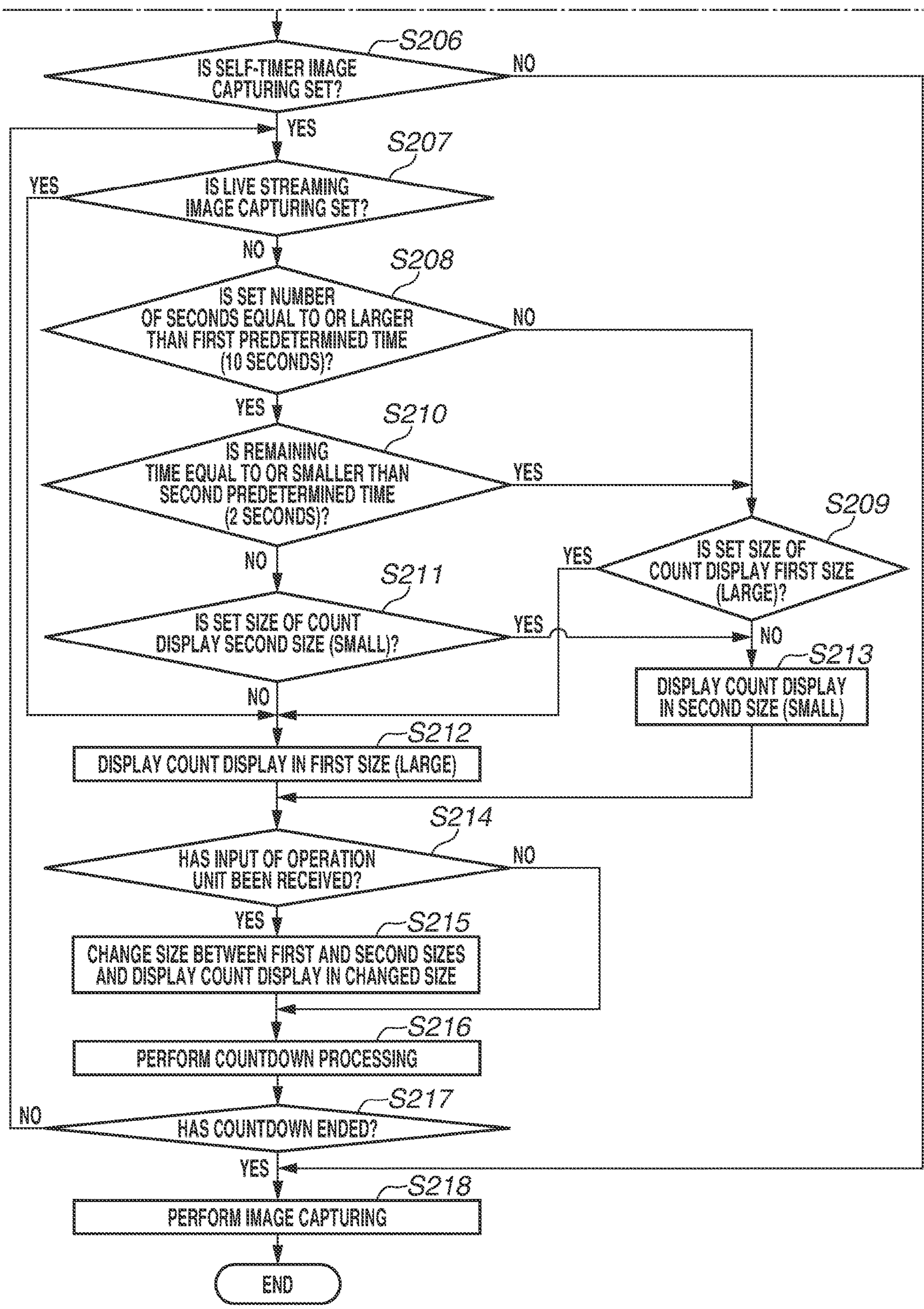
FIG.2B
S206
IS SELF-TIMER IMAGE CAPTURING SET?
NO
YES
S207
IS LIVE STREAMING IMAGE CAPTURING SET?
YES
NO
S208
IS SET NUMBER OF SECONDS EQUAL TO OR LARGER THAN FIRST PREDETERMINED TIME (10 SECONDS)?
NO
YES
S210
IS REMAINING TIME EQUAL TO OR SMALLER THAN SECOND PREDETERMINED TIME (2 SECONDS)?
YES
S209
IS SET SIZE OF COUNT DISPLAY FIRST SIZE (LARGE)?
YES
NO
S211
IS SET SIZE OF COUNT DISPLAY SECOND SIZE (SMALL)?
YES
NO
S213
DISPLAY COUNT DISPLAY IN SECOND SIZE (SMALL)
NO
S212
DISPLAY COUNT DISPLAY IN FIRST SIZE (LARGE)
S214
HAS INPUT OF OPERATION UNIT BEEN RECEIVED?
NO
YES
S215
CHANGE SIZE BETWEEN FIRST AND SECOND SIZES AND DISPLAY COUNT DISPLAY IN CHANGED SIZE
S216
PERFORM COUNTDOWN PROCESSING
S217
NO
HAS COUNTDOWN ENDED?
YES
S218
PERFORM IMAGE CAPTURING
END

IMAGING CONTROL APPARATUS, CONTROL METHOD OF THE SAME, AND STORAGE MEDIUM

BACKGROUND

Field of the Disclosure

The present disclosure relates to an imaging control apparatus, a control method of the same, and a storage medium.

Description of the Related Art

There has been known self-timer image capturing in which a time of a self-timer is set, and image capturing is started if the set time elapses from when an image capturing instruction is issued by a user.

Japanese Patent Application Laid-Open No. 2004-282399 discusses a technique including a function of displaying information reporting an image capturing timing in self-timer image capturing, on a sub-display unit mounted on the back side of a mobile phone.

In the technique discussed in Japanese Patent Application Laid-Open No. 2004-282399, when a distance between a subject (user) and a camera is far, it is difficult to check the display of the countdown. On the other hand, if the display of the countdown is enlarged, the display of the countdown disturbs the user in checking the subject when a distance between the subject and the camera is short for the purpose of self-image capturing. In this case, for example, if a sensor that measures a distance between a camera and a subject is included in the camera, the countdown can be presented in accordance with the measured distance between the camera and the subject. Nevertheless, providing such a sensor that measures a distance between a camera and a subject leads to a cost increase.

SUMMARY OF THE INVENTION

The present disclosure is directed to performing an appropriate count display in accordance with a setting of a self-timer.

According to an aspect of the present invention, an imaging control apparatus includes a setting unit configured to set a time of a self-timer, a control unit configured to control image capturing to be performed upon a lapse of the time set by the setting unit from when an image capturing instruction is issued, and a display control unit configured to control a count display to be displayed with a first size in a case where the time set by the setting unit is equal to or larger than a first predetermined time, and to control the count display to be displayed with a second size smaller than the first size in a case where the time set by the setting unit is smaller than the first predetermined time.

Further features of the present invention will become apparent from the following description of exemplary embodiments with reference to the attached drawings.

BRIEF DESCRIPTION OF THE DRAWINGS

FIGS. 1A and 1B are diagrams illustrating an example of a configuration of a camera according to an exemplary embodiment of the present invention.

DESCRIPTION OF THE EMBODIMENTS

Hereinafter, exemplary embodiments of the present disclosure will be described with reference to the drawings. In the following exemplary embodiments, the description will be given using, as an example, a case where an imaging control apparatus is a digital camera (hereinafter, will be described as a camera).

Figure 1B:
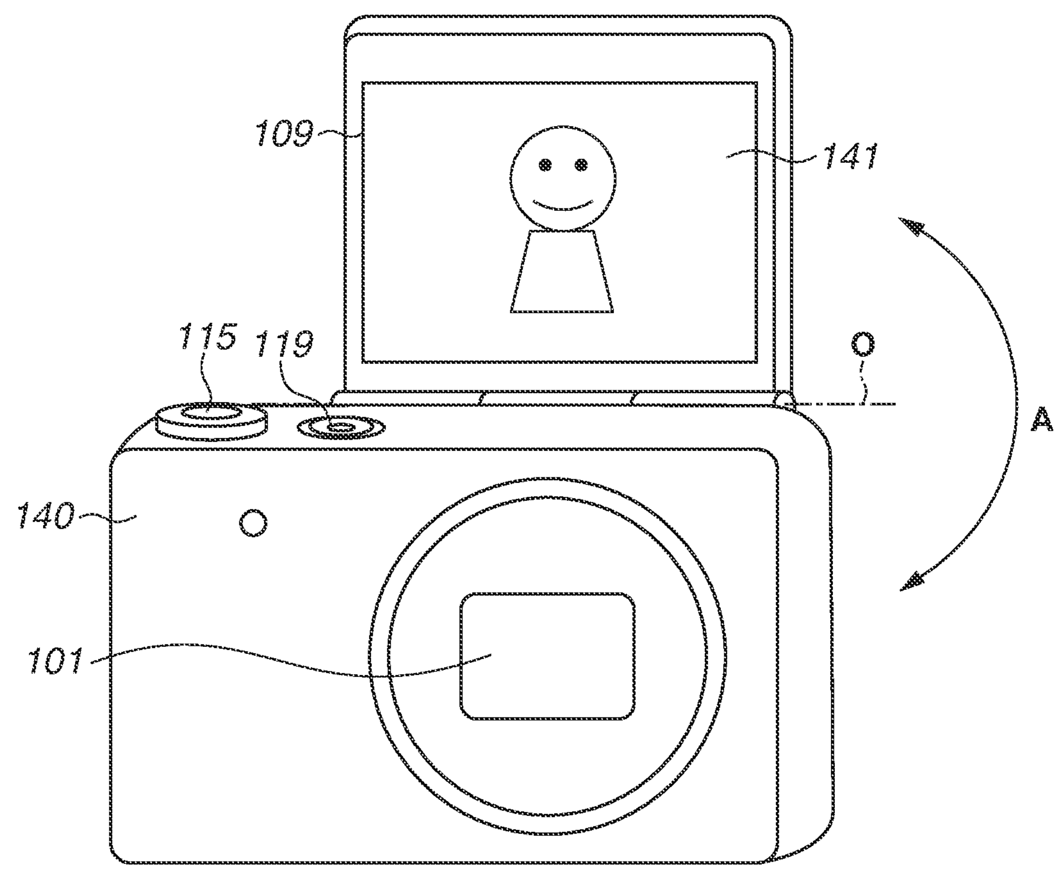

Hereinafter, a first exemplary embodiment will be described. FIGS. 1A and 1B are diagrams illustrating a configuration of a camera 100, and FIG. 1A is a block diagram illustrating an example of the configuration of the camera 100.

An imaging lens 101 is a lens unit including a zoom lens and a focus lens. A shutter 102 has a diaphragm function. An imaging unit 103 is an image sensor including a charge-coupled device (CCD) sensor or a complementary metal-oxide semiconductor (CMOS) sensor that converts an optical image into an electrical signal. The imaging unit 103 corresponds to an example of an imaging unit. An analog-to-digital (A/D) converter 104 converts an analog signal output from the imaging unit 103, into a digital signal. By covering an imaging system including the imaging lens 101 of the camera 100, a barrier 105 protects the imaging system including the imaging lens 101, the shutter 102, and the imaging unit 103, from dirt or damage.

An image processing unit 106 performs various types of image processing based on the control performed by a system control unit 50. More specifically, the image processing unit 106 performs resize processing, such as predetermined pixel interpolation or reduction, and color conversion processing on image data from the A/D converter 104 or image data from a memory control unit 107. The image processing unit 106 also performs predetermined calculation processing using data of a captured image, and the system control unit 50 performs exposure control and ranging control based on the obtained calculation result. Through-the-lens (TTL) system autofocus (AF) processing, auto-exposure (AE) processing, and electronic flash pre-emission (EF) processing are thereby performed. In addition, the image processing unit 106 performs predetermined calculation processing using data of a captured image, and performs TTL system automatic white balance (AWB) processing based on the obtained calculation result.

Image data from the A/D converter 104 is directly written into a memory 108 via the image processing unit 106 and the memory control unit 107, or via the memory control unit 107. The memory 108 stores image data obtained by the imaging unit 103 and converted by the A/D converter 104 into digital data, and image data to be displayed on a display unit 109. The memory 108 has a storage capacity sufficient for storing a predetermined number of still images, and a predetermined time length of a moving image and voice. In addition, the memory 108 also serves as a memory for image display (video memory).

A digital-to-analog (D/A) converter 110 converts data for image display that is stored in the memory 108 into an analog signal, and supplies the analog signal to the display unit 109. The image data for display that has been written into the memory 108 is accordingly displayed by the display unit 109 via the D/A converter 110. The display unit 109 performs display in accordance with an analog signal from the D/A converter 110, on a display device such as a liquid crystal display (LCD). Digital signals once A/D-converted by the A/D converter 104 and accumulated in the memory 108 are converted by the D/A converter 110 into analog signals, and the analog signals are sequentially transferred to the display unit 109 and displayed thereon. A live view image is thereby displayed on the display unit 109, and the display unit 109 functions as an electronic viewfinder.

A nonvolatile memory 111 is an electrically-erasable/recordable memory, and for example, an electrically erasable programmable read-only memory (EEPROM) is used. Constants for operating the system control unit 50 and programs are stored in the nonvolatile memory 111. The programs include a program for executing a flowchart to be described below in the present exemplary embodiment.

The system control unit 50 includes at least one processor (including a circuit), and controls the entire camera 100. The system control unit 50 corresponds to an example of a setting unit, a size setting unit, a transmission setting unit, a reception unit, a control unit, and a display control unit. By executing a program stored in the nonvolatile memory 111, the system control unit 50 implements each piece of processing according to the present exemplary embodiment, which will be described below. In addition, the system control unit 50 also performs display control by controlling the memory 108, the D/A converter 110, and the display unit 109.

For example, a random access memory (RAM) is used as a system memory 112. Constants for operating the system control unit 50, variables, and programs read out from the nonvolatile memory 111 are loaded onto the system memory 112. A system timer 113 is a time measuring unit for measuring time used for various types of control or the time of a built-in clock. The system timer 113 measures time to be displayed when countdown processing is performed in self-timer image capturing.

A mode selection switch 114, a shutter button 115, an operation unit 118, and a power switch 119 are operation units for inputting various operation instructions to the system control unit 50.

The mode selection switch 114 switches an operation mode to any of a still image capturing mode, a moving image capturing mode, and a reproduction mode. The system control unit 50 sets an operation mode switched by the mode selection switch 114. The still image capturing mode includes an automatic image capturing mode, an automatic scene determination mode, a manual mode, an aperture priority mode (Av mode), and a shutter speed priority mode (Tv mode). The still image capturing mode further includes various scene modes having different image capturing settings for respective image capturing scenes, a program AE mode, and a custom mode. Via the mode selection switch 114, the user can directly switch an operation mode to any of the modes included in the still image capturing mode. Alternatively, an operation mode may be switched in the following manner. The mode selection switch 114 once switches a screen to a list screen where a plurality of image capturing modes are listed. Then, the operation mode is switched to any of the plurality of modes using another operation member. In a similar manner, the moving image capturing mode may also include a plurality of modes.

A first shutter switch 116 is turned ON in the middle of an operation of the shutter button 115. That is to, the first shutter switch 116 is turned ON by half press of the shutter button 115 (an image capturing preparation instruction), and generates a first shutter switch signal SW1. In accordance with the first shutter switch signal SW1, the system control unit 50 starts an operation of AF processing, AE processing, AWB processing, or EF processing.

A second shutter switch 117 is turned ON upon the completion of an operation of the shutter button 115. That is, the second shutter switch 117 is turned ON by full press of the shutter button 115 (image capturing instruction), and generates a second shutter switch signal SW2. In accordance with the second shutter switch signal SW2, the system control unit 50 starts operations of a series of image capturing processes starting from the readout of a signal from the imaging unit 103 up to the writing of image data onto a recording medium 130.

By selecting and operating various functional icons displayed on the display unit 109, functions are appropriately allocated to the respective operation members of the operation unit 118 for each scene, and the operation members function as various functional buttons. Examples of the functional buttons include an end button, a return button, an image feed button, a jump button, a narrowing-down button, and an attribute change button. For example, if a menu button is pressed, a menu screen for enabling various settings to be made is displayed on the display unit 109. The user can intuitively perform various settings using the menu screen displayed on the display unit 109, four-direction (up, down, left, and right) buttons, and a determination button.

In addition, the operation unit 118 includes a touch panel. The touch panel can detect a touch performed on the display unit 109, and detects a touch operation performed by the user. The touch panel and the display unit 109 can be integrally formed. For example, the touch panel is attached to the top layer of a display surface of the display unit 109 so that the transmittance of light does not disturb the display on the display unit 109. Then, an input coordinate on the touch panel and a display coordinate on the display unit 109 are associated with each other. This structure can provide a graphical user interface (GUI) that performs display as if the user could directly operate a screen displayed on the display unit 109. As the touch panel, a touch panel of any of the following various types may be used: a resistive touch panel, a capacitive touch panel, a surface acoustic wave touch panel, an infrared touch panel, an electromagnetic induction type touch panel, an image recognition type touch panel, and an optical sensor type touch panel. Depending on the type of a touch panel, some touch panels detect a touch upon detecting contact with the touch panel while the other touch panels detect a touch upon detecting the proximity of a finger or a stylus to the touch panel. A touch panel of any type of these may be used.

A power supply control unit 120 includes a battery detection circuit, a direct current to direct current (DC-DC) converter, and a switch circuit for switching a block to be supplied with power. The power supply control unit 120 detects whether a battery is attached, the type of the battery, and remaining battery capacity. In addition, the power supply control unit 120 controls the DC-DC converter based on the detection result and an instruction from the system control unit 50, and supplies necessary voltage to components including the recording medium 130 for a necessary time period. A power supply unit 121 includes a primary battery such as an alkaline battery or a lithium battery, a secondary battery such as a nickel-cadmium (NiCd) battery, a nickel-metal hydride (NiMH) battery, or a lithium (Li) battery, and an alternating current (AC) adapter. A recording medium interface (I/F) 122 is an interface to the recording medium 130. The recording medium 130 includes a semiconductor memory, an optical disc, or a magnetic disc.

A communication unit 123 is connected to an external device wirelessly or via a wired cable, and transmits or receives images and voice to and from the external device. The communication unit 123 can also be connected to a wireless local area network (LAN) and the Internet. The communication unit 123 can transmit data of an image (including a live view image) captured by the imaging unit 103 and image data recorded on the recording medium 130. In addition, the communication unit 123 can also receive image data and other various types of information from the external device. In addition, the communication unit 123 connects with an external device such as a remote controller, a smartphone, or a tablet personal computer (PC), and receives an operation request from the user via the external device. The communication unit 123 notifies the system control unit 50 of the operation request from the user, and the system control unit 50 controls each component. The remote control of an image capturing operation or a setting change operation of the camera 100 is thereby implemented.

An orientation detection unit 124 detects the orientation of the camera 100 with respect to a direction of gravitational force. Based on the orientation detected by the orientation detection unit 124, it can be determined whether an image captured by the imaging unit 103 is an image captured by the camera 100 being held in a traverse direction or an image captured by the camera 100 being held in a longitudinal direction. The system control unit 50 can add orientation information corresponding to the orientation detected by the orientation detection unit 124, to an image file of an image captured by the imaging unit 103, and can also rotate an image and record the rotated image. As the orientation detection unit 124, an acceleration sensor or a gyro sensor can be used.

FIG. 1B is a diagram illustrating an example of an exterior configuration of the camera 100, and is a diagram illustrating the camera 100 viewed from the imaging lens 101 side.

In the camera 100 of the present exemplary embodiment, for example, the display unit 109 is rotatable by a hinge portion in a direction indicated by an arrow A about a rotational axis O, with respect to a casing 140 of the camera 100. Specifically, the display unit 109 is rotatable between a state in which a display surface (screen) is overlaid on the casing 140 and faces an opposite side (camera back surface side) of a subject side, and a state in which the display surface (screen) protrudes from the casing 140 as illustrated in FIG. 1B and faces the subject side.

In the state illustrated in FIG. 1B, an image capturing direction and a display direction of the display unit 109 are the same, and the display surface of the display unit 109 is visible from a subject existing in the image capturing direction. Thus, in the state illustrated in FIG. 1B, when the user performs self-image capturing in that the user himself/herself becomes a subject, the user himself/herself can be displayed on the display unit 109 as a live view image 141.

The camera 100 of the present exemplary embodiment can also perform self-timer image capturing suitable for self-image capturing. In the case of performing self-timer image capturing, a time until image capturing is executed is numerically displayed as a count display on the display unit 109, so that the user can check a remaining time until image capturing is executed.

In the present exemplary embodiment, the size of the count display is changed in accordance with a set time of a self-timer in such a manner that appropriate count display can be performed in accordance with the setting of the self-timer.

Hereinafter, processing in which the camera 100 changes the size of the count display in accordance with a time of the self-timer will be specifically described.

Figure 2:
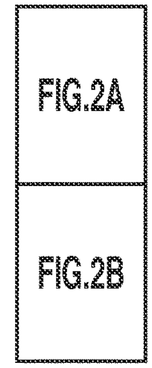
FIG. 2 is divided into two parts, including FIGS. 2A and 2B, collectively a flowchart illustrating an example of processing performed by the camera according to the exemplary embodiment of the present invention.
Figure 2A:
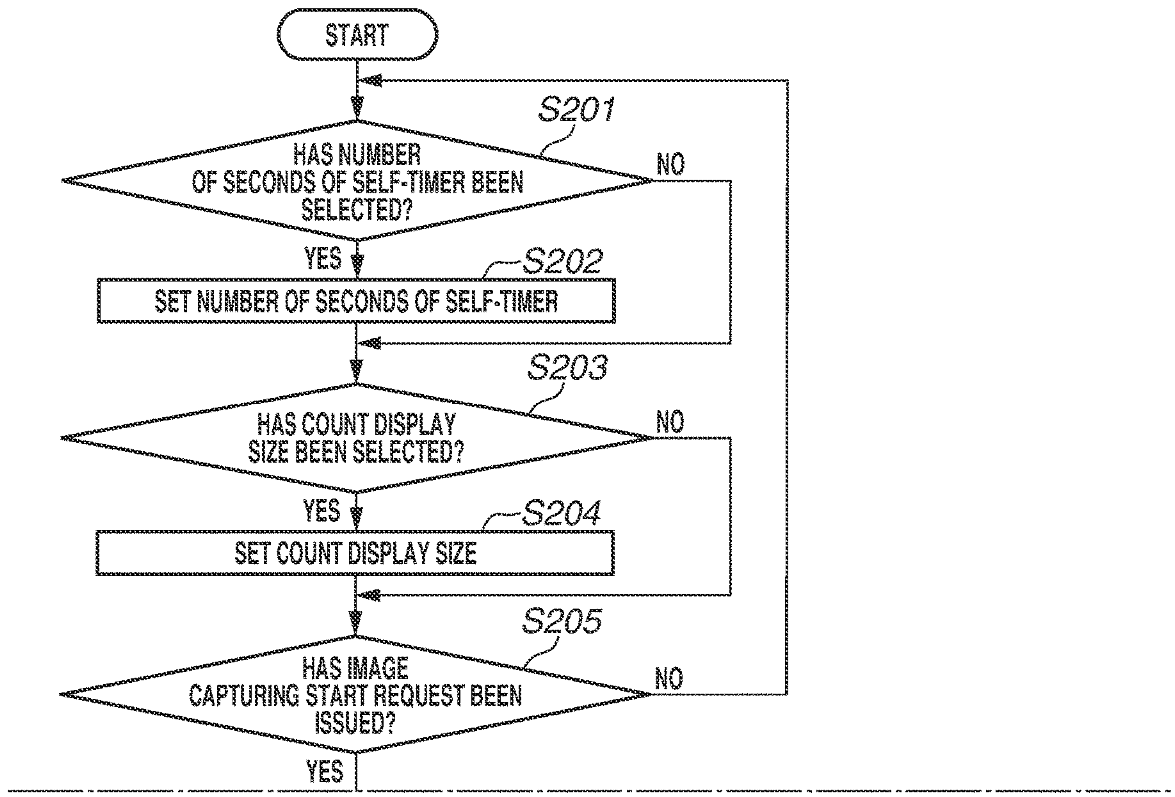

FIGS. 2A and 2B are a flowchart illustrating an example of processing performed by the camera 100. Each process of the flowchart illustrated in FIGS. 2A and 2B is implemented by the system control unit 50 loading a program stored in the nonvolatile memory 111 onto the system memory 112 and executing the program. The flowchart illustrated in FIGS. 2A and 2B is started when the system control unit 50 sets an operation mode to either the still image capturing mode or the moving image capturing mode and displays a live view image on the display unit 109. A condition for starting the flowchart illustrated in FIGS. 2A and 2B may include a state in which the image capturing direction and the display direction of the display unit 109 are the same as illustrated in FIG. 1B.

In step S201, the system control unit 50 determines whether the number of seconds has been selected for a self-timer by the user. The number of seconds of the self-timer corresponds to an example of a time of a self-timer. The time of the self-timer refers to a time to be elapsed until image capturing is automatically executed. In addition, the time does not mean a clock time, and refers to a length (period) of time. If the number of seconds of the self-timer has been selected (YES in step S201), the processing proceeds to step S202. If the number of seconds of the self-timer has not been selected (NO in step S201), the processing proceeds to step S203.

Figure 3:
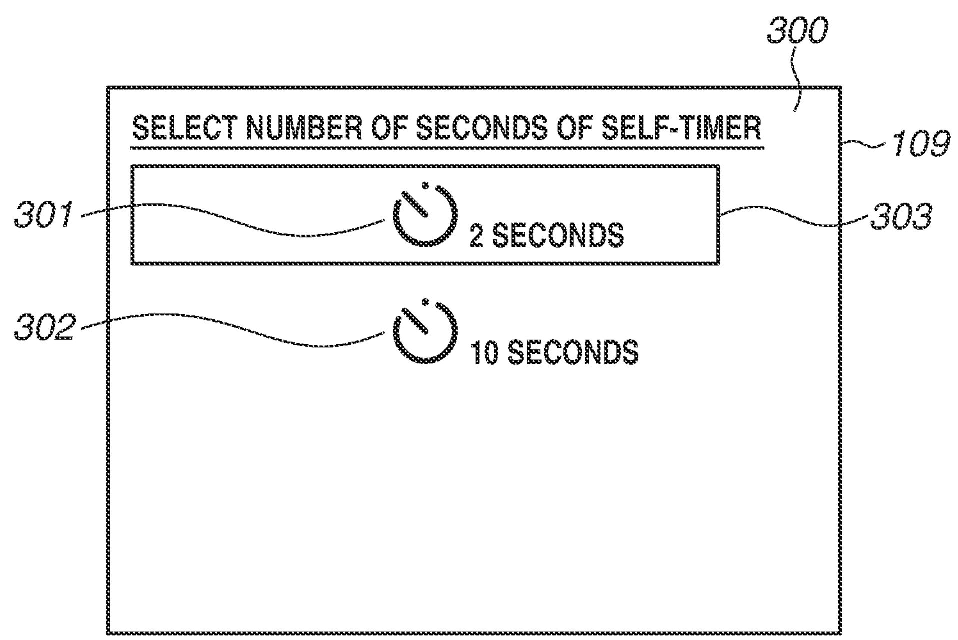
FIG. 3 is a diagram illustrating an example of a screen for selecting the number of seconds to which a self-timer is set to according to the exemplary embodiment of the present invention.

FIG. 3 is a diagram illustrating an example of a screen 300 for selecting the number of seconds of the self-timer. The system control unit 50 displays the screen 300 on the display unit 109 when the user selects an item of self-timer image capturing via a menu screen.

Number-of-seconds-items 301 and 302, and a cursor 303 are displayed on the screen 300.

The number-of-seconds item 301 is a display item indicating that the number of seconds of the self-timer is set to 2 seconds. The number-of-seconds item 302 is a display item indicating that the number of seconds of the self-timer is set to 10 seconds. The cursor 303 is a display item for the user to select the number-of-seconds item 301 or 302. The user can select the number of seconds of the self-timer by moving the cursor 303 to the number-of-seconds item 301 or 302 and pressing a determination button using the operation unit 118. In the present exemplary embodiment, the user can select 2 seconds or 10 seconds as the number of seconds of the self-timer.

Nevertheless, the selectable number of seconds of the self-timer is not limited to 2 seconds and 10 seconds. For example, the number of seconds may be selectable from three or more items indicating respectively different numbers of seconds, or an arbitrary number of seconds may be selectable by the user. In addition, turn-off of self-timer image capturing may be selectable.

In step S202, the system control unit 50 sets the number of seconds of the self-timer. The processing corresponds to an example of processing performed by a setting unit. Specifically, the system control unit 50 sets the number of seconds of the self-timer by storing, into the system memory 112, information regarding the number of seconds corresponding to the selected number-of-seconds item 301 or 302. The nonvolatile memory 111 stores the information regarding the number of seconds corresponding to the number-of-seconds item 301 or 302.

In step S203, the system control unit 50 determines whether a count display size has been selected by the user. The count display refers to a numerical display of a time until image capturing is automatically executed. In addition, the count display size refers to a size of a character, i.e., a number. In the present exemplary embodiment, a remaining time until image capturing is automatically executed, i.e., a remaining time of the self-timer is numerically displayed as a count display. If the user desires to display the count display in a desired size irrespective of the number of seconds of the self-timer, the user can preliminarily select a count display size. If a count display size has been selected (YES in step S203), the processing proceeds to step S204. If a count display size has not been selected (NO in step S203), the processing proceeds to step S205.

Figure 4:
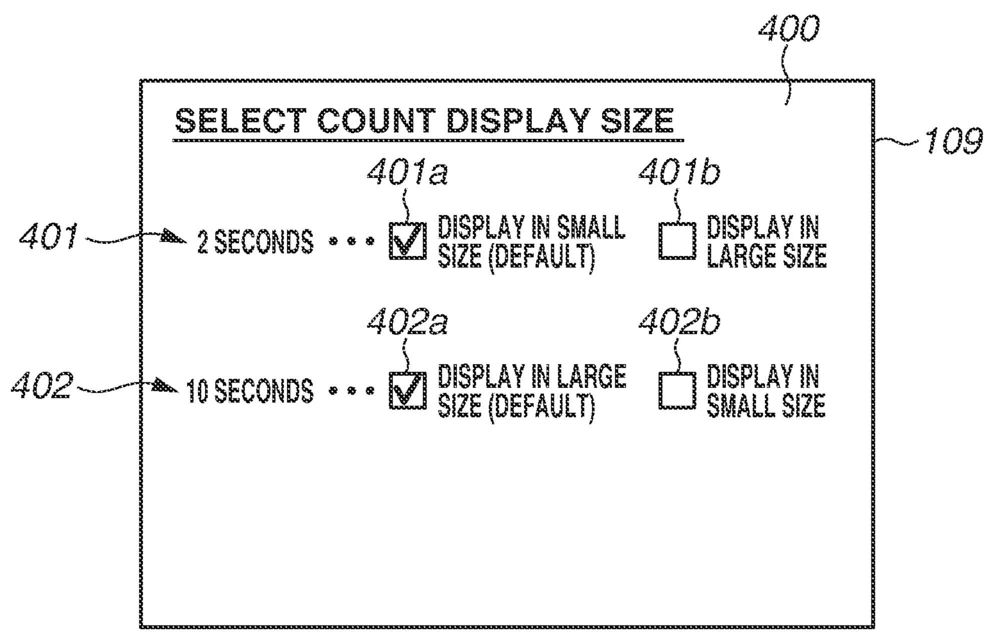
FIG. 4 is a diagram illustrating an example of a screen for selecting a size of a count display according to the exemplary embodiment of the present invention.

FIG. 4 is a diagram illustrating an example of a screen 400 for displaying a count display in a desired size. The system control unit 50 displays the screen 400 on the display unit 109 when an item for selecting a count display size is selected by the user via the menu screen.

Display size items 401 and 402 are displayed on the screen 400.

The display size item 401 includes options 401*a* and 401*b* for selecting a count display size in a case where the number of seconds of the self-timer is set to 2 seconds. The option 401*a* is an option to be selected when the count display size is desired to be set to a small size in a case where the number of seconds of the self-timer is set to 2 seconds. On the other hand, the option 401*b* is an option to be selected when the count display size is desired to be set to a large size in a case where the number of seconds of the self-timer is set to 2 seconds. The large size of a count display corresponds to an example of a first size. In addition, the small size of a count display corresponds to an example of a second size. The user selects, from the options 401*a* and 401*b*, a display size desired in a case where the number of seconds of the self-timer is set to 2 seconds. In a case where the number of seconds of the self-timer is set to 2 seconds, the option 401*a* for displaying the count display in the small size is selected by default. In other words, in a case where the user does not select a count display size via the menu screen, the option 401*a* is selected.

On the other hand, the display size item 402 includes options 402*a* and 402*b* for selecting a count display size in a case where the number of seconds of the self-timer is set to 10 seconds. The option 402*a* is an option to be selected when a count display size is desired to be set to the large size in a case where the number of seconds of the self-timer is set to 10 seconds. On the other hand, the option 402*b* is an option to be selected when a count display size is desired to be set to the small size in a case where the number of seconds of the self-timer is set to 10 seconds. The user selects, from the options 402*a* and 402*b*, a display size desired in a case where the number of seconds of the self-timer is set to 10 seconds. In a case where the number of seconds of the self-timer is set to 10 seconds, the option 402*a* for displaying the count display in the large size is selected by default. In other words, in a case where the user does not select a count display size via the menu screen, the option 402*a* is selected.

By selecting the option 401*a*, 401*b*, 402*a*, or 402*b* and pressing the determination button, the user can select the large or small size as a count display size.

A selectable count display size is not limited to the large and small sizes. For example, a count display size may be selectable from three or more items indicating respectively different sizes, or an arbitrary size may be selectable by the user.

In step S204, the system control unit 50 sets a count display size. The processing corresponds to an example of processing performed by a size setting unit. Specifically, the system control unit 50 sets a count display size by storing information regarding a selected count display size in association with the display size item 401 or 402 in the system memory 112.

In step S205, the system control unit 50 determines whether an image capturing start request has been issued. Specifically, in a case where the shutter button 115 has been fully pressed by the user and the second shutter switch signal SW2 has been received, the system control unit 50 determines that an image capturing start request has been issued. On the other hand, in a case where the second shutter switch signal SW2 has not been received, the system control unit 50 determines that an image capturing start request has not been issued. If an image capturing start request has been issued (YES in step S205), the processing proceeds to step S206. If an image capturing start request has not been issued (NO in step S205), the processing returns to step S201.

In step S206, the system control unit 50 determines whether self-timer image capturing is set. Specifically, if information regarding the number of seconds of the self-timer is stored in the system memory 112, the system control unit 50 determines that self-timer image capturing is set. On the other hand, if information regarding the number of seconds of the self-timer is not stored in the system memory 112, the system control unit 50 determines that self-timer image capturing is not set. In a case where turning off the self-timer image capturing is selectable on the screen 300 illustrated in FIG. 3, and the user has selected "off", the system control unit 50 determines that self-timer image capturing is not set.

If self-timer image capturing is set (YES in step S206), the processing proceeds to step S207. If self-timer image capturing is not set (NO in step S206), the processing proceeds to step S218.

In step S207, the system control unit 50 determines whether live streaming image capturing is set. The live streaming image capturing refers to an image capturing method in which the camera 100 transmits a live view image to the exterior via the communication unit 123. The system control unit 50 presets live streaming image capturing in accordance with an operation performed by the user. The processing corresponds to an example of processing performed by a transmission setting unit.

If live streaming image capturing is set (YES in step S207), the processing proceeds to step S212. If live streaming image capturing is not set (NO in step S207), the processing proceeds to step S208.

In step S208, the system control unit 50 determines whether the set number of seconds of the self-timer is equal to or larger than a first predetermined time. Specifically, the system control unit 50 performs the determination by acquiring information regarding the number of seconds that is stored in the system memory 112. Information regarding the first predetermined time is pre-stored in the nonvolatile memory 111, for example. If the set number of seconds of the self-timer is equal to or larger than the first predetermined time (YES in step S208), the processing proceeds to step S210. If the set number of seconds of the self-timer is smaller than the first predetermined time (NO in step S208), the processing proceeds to step S209.

In the present exemplary embodiment, for example, the first predetermined time is set to 10 seconds, and is the same as the number of seconds corresponding to the number-of-seconds item 301. Thus, if the user selects the number-of-seconds item 302 for setting the number of seconds of the self-timer to 10 seconds on the screen 300 illustrated in FIG. 3, which means that the set number of seconds of the self-timer is equal to or larger than 10 seconds (YES in step S208), the processing proceeds to step S210. On the other hand, if the user selects the number-of-seconds item 301 for setting the number of seconds of the self-timer to 2 seconds on the screen 300 illustrated in FIG. 3, which means that the set number of seconds of the self-timer is smaller than 10 seconds (NO in step S208), the processing proceeds to step S209. In a case where the number of seconds of the self-timer is selectable from three or more items indicating respectively different numbers of seconds, the first predetermined time is set to a time that is larger than the minimum number of seconds of the self-timer and is smaller than the maximum number of seconds of the self-timer.

In step S209, the system control unit 50 determines whether the set count display size is the large size, i.e., the first size. Specifically, the system control unit 50 performs the determination by acquiring the information regarding the count display size that is stored in the system memory 112 in association with the display size item 401. If the set count display size is the large size, i.e., the first size (YES in step S209), the processing proceeds to step S212 so that the count display is displayed in a count display size desired by the user even when the set number of seconds of the self-timer is 2 seconds. On the other hand, if a count display size is not set, because the small size, i.e., the second size, is set in the display size item 401 by default (NO in step S209), the processing proceeds to step S213.

If it is determined in step S208 that the set number of seconds of the self-timer is equal to or larger than the first predetermined time (YES in step S208), the processing proceeds to step S210. In step S210, the system control unit 50 determines whether the remaining number of seconds of the self-timer becomes equal to or smaller than a second predetermined time by performing countdown processing to be described below. Information regarding the second predetermined time is pre-stored in the nonvolatile memory 111, for example. If the remaining number of seconds becomes equal to or smaller than the second predetermined time (YES in step S210), the processing proceeds to step S209. If the remaining number of seconds of the self-timer is longer than the second predetermined time (NO in step S210), the processing proceeds to step S211.

In the present exemplary embodiment, for example, the second predetermined time is set to 2 seconds, and is the same number of seconds as the number of seconds corresponding to the number-of-seconds item 302. Nevertheless, the second predetermined time is only required to be the number of seconds shorter than 10 seconds, i.e., the number of seconds corresponding to the number-of-seconds item 301. The second predetermined time is desirably equal to or smaller than a half of 10 seconds, i.e., the number of seconds corresponding to the number-of-seconds item 301, and equal to or larger than 1 second.

In step S211, the system control unit 50 determines whether the set count display size is the small size, i.e., the second size. Specifically, the system control unit 50 performs the determination by acquiring the information regarding the count display size that is stored in the system memory 112 in association with the display size item 402. If the set count display size is the small size, i.e., the second size (YES in step S211), the processing proceeds to step S213 so that the count display is displayed in a count display size desired by the user even when the set number of seconds of the self-timer is 10 seconds. On the other hand, if a count display size is not set, because the large size, i.e., the first size, is set in the display size item 402 by default (NO in step S211), the processing proceeds to step S212.

In step S212, the system control unit 50 displays a count display in the large size, i.e., the first size. Specifically, if the processing proceeds to step S212 for the first time since the flowchart illustrated in FIGS. 2A and 2B is started, the system control unit 50 acquires the information regarding the number of seconds of the self-timer from the system memory 112, converts the acquired information regarding the number of seconds into a number, and displays the number in the first size. On the other hand, if the processing proceeds to step S212 after the processing in step S212 or S213 is performed, the system control unit 50 converts information regarding the remaining number of seconds of the self-timer into a number, and displays the number in the first size.

At this time, the system control unit 50 displays the count display at a substantially-center position, i.e., a first position, of a screen. Information regarding the first size and information regarding the first position are pre-stored, for example, in the nonvolatile memory 111. In the present exemplary embodiment, if the processing proceeds to step S212 for the first time since the flowchart illustrated in FIGS. 2A and 2B is started, the number "10" as the number of seconds corresponding to the number-of-seconds-item 301 is displayed in the large size as the count display at the substantially center of the screen.

Figure 5A:
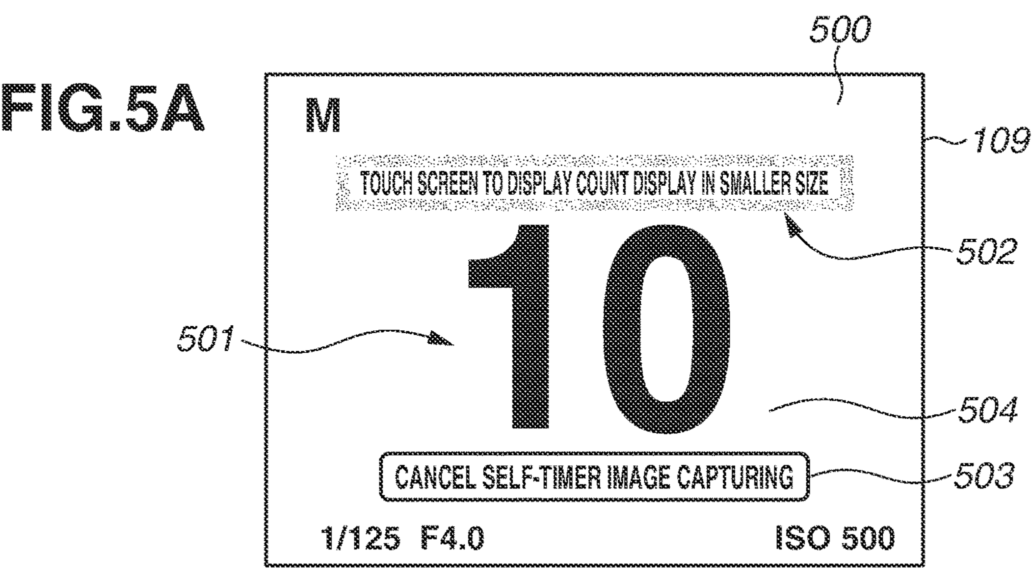
FIGS. 5A, 5B, and 5C are diagrams each illustrating an example of a count display according to the exemplary embodiment of the present invention.

FIG. 5A is a diagram illustrating an example of a count display displayed on a screen 500.

A count display 501, a guidance 502, a "cancel self-timer image capturing" button 503, and a live view image 504 are displayed on the screen 500.

The count display 501 is a display item numerically indicating the remaining time at the present time point until image capturing is automatically executed. FIG. 5A illustrates that the number "10" is displayed as the count display 501, which indicates that image capturing is automatically executed upon the lapse of 10 seconds. The count display 501 illustrated in FIG. 5A is displayed in the large size, i.e., the first size, that is larger than a size of a count display 511 illustrated in FIG. 5B, which will be described below. The count display 501 illustrated in FIG. 5A is displayed at the substantially-center position, i.e., the first position, of the display unit 109. The guidance 502 is a message for providing the user with an operation guidance. In FIG. 5A, a message indicating that touching the screen displays the count display 501 in a smaller size is displayed as the guidance 502. The processing of displaying a count display in a smaller size in accordance with a touch performed on the screen will be described below with reference to steps S214 and S215. The "cancel self-timer image capturing" button 503 is a button to be selected when self-timer image capturing is desired to be canceled. The live view image 504 is an image sequentially transferred from the imaging unit 103. The count display 501 is displayed in a superimposed manner on the live view image 504. In FIG. 5A, the illustration of the live view image 504 is omitted. Because the count display 501 is displayed in a large size at the substantially center of the screen 500, the live view image 504 is hidden behind the count display 501.

In this manner, if it is determined that the set number of seconds of the self-timer is equal to or larger than the first predetermined time in step S208 (YES in step S210), the processing proceeds to step S210. The processing further proceeds through step S212 unless the determination result is YES in step S210 or step S211, so that the count display 501 is displayed in a large size. If the set number of seconds of the self-timer is large, a distance between the camera 100 and the subject (user) is assumed to be far. Thus, the count display 501 is displayed in a large size, which allows the user to more easily check the remaining time until image capturing is executed by viewing the count display 501 displayed on the display unit 109 of the camera 100.

On the other hand, in step S213, the system control unit 50 displays a count display in the "small" size, i.e., the second size. Specifically, if the processing proceeds to step S213 for the first time since the flowchart illustrated in FIGS. 2A and 2B is started, the system control unit 50 acquires the information regarding the number of seconds of the self-timer from the system memory 112, converts the acquired information regarding the number of seconds into a number, and displays the number in the second size. On the other hand, if the processing proceeds to step S213 after the processing in step S212 or S213 is performed, the system control unit 50 converts information regarding the remaining number of seconds of the self-timer into a number, and displays the number in the second size.

At this time, the system control unit 50 displays the count display at a position near an end portion, which is a second position of the screen. Information regarding the second size and information regarding the second position are pre-stored in, for example, the nonvolatile memory 111. In the present exemplary embodiment, if the processing proceeds to step S213 for the first time since the flowchart illustrated in FIGS. 2A and 2B is started, the number "2" as the number of seconds corresponding to the number-of-seconds item 302, or the number "10" as the number of seconds corresponding to the number-of-seconds item 301 is displayed in a small size as the count display near the end portion of the screen.

Figure 5B:
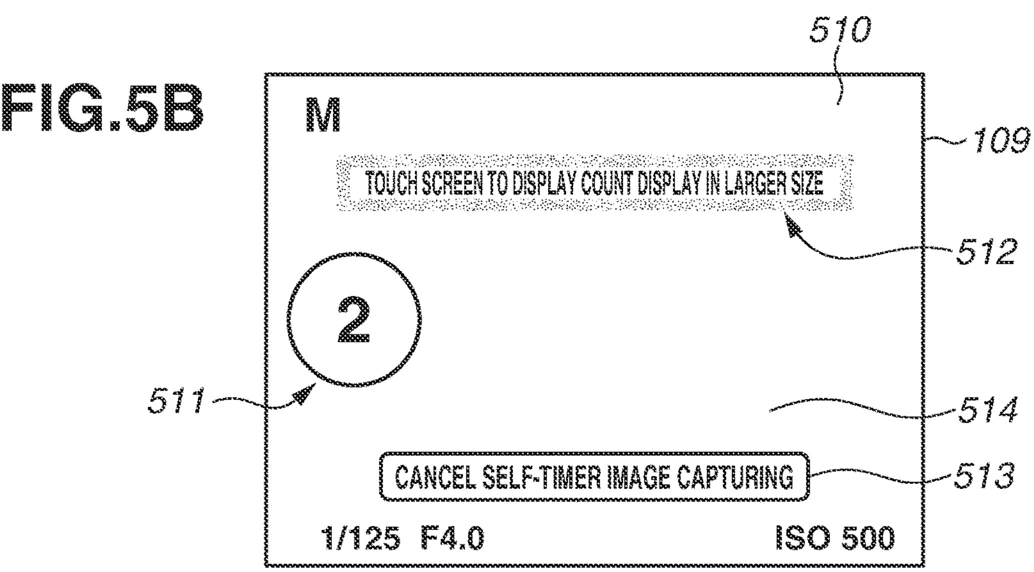

FIG. 5B is a diagram illustrating an example of a count display displayed on a screen 510.

A count display 511, a guidance 512, a "cancel self-timer image capturing" button 513, and a live view image 514 are displayed on the screen 510.

The count display 511 is a display item numerically indicating the remaining time at the present time point until image capturing is automatically executed. FIG. 5B illustrates that the number "2" is displayed as the count display 511, which indicates that image capturing is automatically executed upon the lapse of 2 seconds. The count display 511 illustrated in FIG. 5B is displayed in the small size, i.e., the second size, that is smaller than the size of the count display 501 illustrated in FIG. 5A. In addition, the count display 511 illustrated in FIG. 5B is displayed at a position distant from the substantially-center position of the display unit 109. In FIG. 5B, the count display 511 is displayed at a position near the left side end portion, which is the second position. The guidance 512 is a message for providing the user with an operation guidance. In FIG. 5B, a message indicating that touching the screen displays the count display 511 in a larger size is displayed as the guidance 512. The processing of displaying the count display in a larger size in accordance with a touch performed on the screen will be described below with reference to steps S214 and S215. The "cancel self-timer image capturing" button 513 is a button to be selected when self-timer image capturing is desired to be canceled. The live view image 514 is an image sequentially transferred from the imaging unit 103. In FIG. 5B, the illustration of the live view image 514 is omitted. Although the count display 511 is displayed in a superimposed manner on the live view image 514, the count display 511 is displayed in a small size at a distance from the center, so that the live view image 514 is prevented from being hidden behind the count display 511.

In this manner, if it is determined that the set number of seconds of the self-timer is smaller than the first predetermined time in step S208 (NO in step S208), the processing proceeds to step S209. The processing further proceeds to step S213 unless the determination result is YES in step S209, so that the count display 511 is displayed in a small size. If the set number of seconds of the self-timer is small, a distance between the camera 100 and the subject (user) is assumed to be short. Thus, by displaying the count display 511 in a small size, even in a case where the user performs self-image capturing while holding the camera 100 with his/her hand, the count display 511 does not disturb the user in viewing the live view image 514 and the user can check a field angle. Although the count display 511 is small, the user can check the remaining time until image capturing is executed, by viewing the count display 511.

In addition, if live streaming image capturing is set in step S207 (YES in step S207), the processing proceeds to step S212 irrespective of the set number of seconds of the self-timer, so that the count display is displayed in the large size, i.e., the first size. In this manner, in a case where live streaming image capturing is set, the count display is displayed in the large size, i.e., the first size. This is because a moving image is captured in the live streaming image capturing, and the user is less likely to check a live view image compared to a case of still image capturing. By displaying the count display in the large size, i.e., the first size, in a case where live streaming image capturing is set for the purpose of transmitting a moving image to the exterior, it becomes easier for the user to recognize a timing at which the moving image is transmitted to the exterior.

If it is determined in step S210 that the remaining time of the self-timer becomes equal to or smaller than the second predetermined time (YES in step S210), the processing proceeds through step S213 irrespective of the set number of seconds of the self-timer unless the determination result is YES in step S209. Thus, the count display is displayed in the small size, i.e., the second size. In this manner, even when the set number of seconds of the self-timer is large, the count display is displayed in a small size if the remaining time of the self-timer becomes short. Thus, even when the user needs some time to prepare for self-image capturing while holding the camera 100 with his/her hand, the count display does not disturb the user in viewing a live view image and the user can check a field angle.

If it is determined in step S209 that the set count display size is the large size, i.e., the first size (YES in step S209), the processing proceeds to step S212 irrespective of the set number of seconds or the remaining time of the self-timer, and the count display is displayed in the large size, i.e., the first size. Thus, the count display is displayed in a count display size desired by the user.

If it is determined in step S211 that the set count display size is the small size, i.e., the second size (YES in step S211), the processing proceeds to step S213 irrespective of the set number of seconds of the self-timer, and the count display is displayed in the small size, i.e., the second size. Thus, the count display is displayed in a count display size desired by the user.

The description will return to the flowchart illustrated in FIGS. 2A and 2B, and processing in step S214 and subsequent steps will be described.

In step S214, the system control unit 50 determines whether an input of the operation unit 118 that is performed by the user has been received. If an input of the operation unit 118 has been received (YES in step S214), the processing proceeds to step S215. If an input of the operation unit 118 has not been received (NO in step S214), the processing proceeds to step S216. When the user desires to change the count display size, the user can change the count display size performing an input via the operation unit 118. In the present exemplary embodiment, the count display size is changed in accordance with an operation of the user touching the screen of the display unit 109, that is, an operation of touching the touch panel in a state in which the count display is displayed. In the examples illustrated in FIGS. 5A and 5B, the count display size is changed by touching a region in the screen of the display unit 109 other than the area of the "cancel self-timer image capturing" button 503 or 513.

In step S215, the system control unit 50 changes the count display size from the first size to the second size or from the second size to the first size, and displays the count display in the changed size.

Figure 5C:
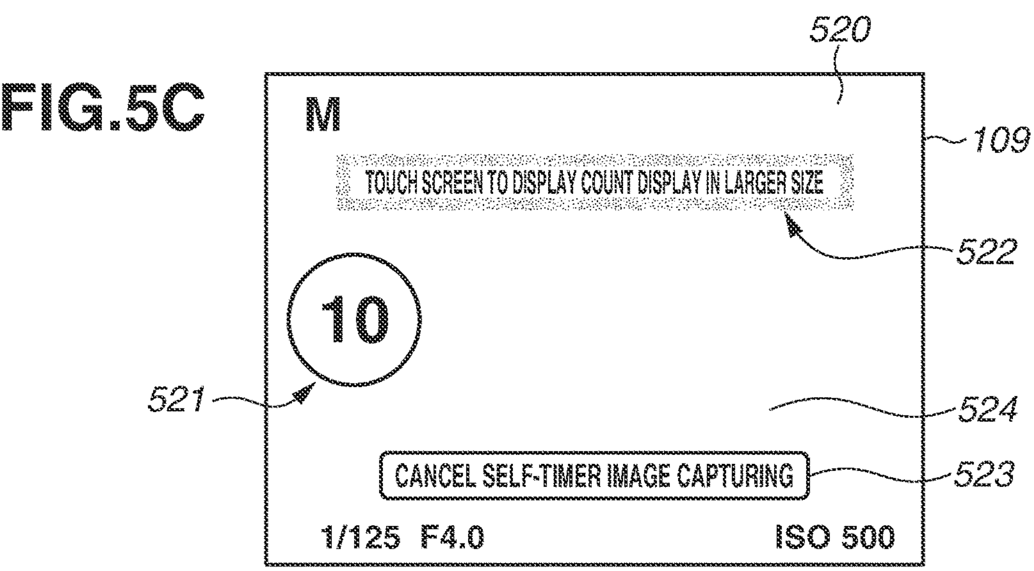

FIG. 5C is a diagram illustrating an example of a count display displayed on a screen 520 in a changed size. The screen 520 illustrated in FIG. 5C is a screen displayed after a screen transition is made by a touch on the screen 500 illustrated in FIG. 5A.

A count display 521, a guidance 522, a "cancel self-timer image capturing" button 523, and a live view image 524 are displayed on the screen 520.

As illustrated in FIG. 5C, the count display size is changed in such a manner that the size of the count display 521 becomes smaller than that of the count display 501 illustrated in FIG. 5A. Specifically, the count display size is changed from the large size, i.e., the first size, to the small size, i.e., the second size, and the count display 521 is displayed in the changed size.

In addition, the position is changed in such a manner that the count display 521 illustrated in FIG. 5C is displayed at a position different from the position at which the count display 501 illustrated in FIG. 5A is displayed. Specifically, the position of the count display is changed from the substantially-center position, i.e., the first position, to the position near the left side end portion, i.e., the second position, and the count display 521 is displayed at the changed position. In addition, the message provided in the guidance is changed to a message indicating that touching the screen displays the count display 521 in a larger size, and the changed message is displayed as the guidance 522. The "cancel self-timer image capturing" button 523 is a button to be selected when self-timer image capturing is desired to be canceled. In this manner, because the count display 521 is displayed in the small size at a distance from the center, the center of the live view image 524 is prevented from being hidden behind the count display 521.

The description has been given of a case where the screen 500 illustrated in FIG. 5A transitions to the screen 520 illustrated in FIG. 5C. In contrast, if the screen 520 illustrated in FIG. 5C is touched, the screen 520 illustrated in FIG. 5C transitions to the screen 500 illustrated in FIG. 5A. More specifically, the count display size is changed from the small size, i.e., the second size, to the large size, i.e., the first size, and the position of the count display is changed from the position near the left side end portion, i.e., the second position, to the substantially-center position, i.e., the first position, and the count display is displayed in the changed position. In this manner, because the count display is displayed in the large size at the substantially center, it becomes easier for the user to check the remaining time until image capturing is executed.

Next, the description will return to the flowchart illustrated in FIGS. 2A and 2B, and processing in step S216 and subsequent steps will be described.

In step S216, based on the time measured by the system timer 113, the system control unit 50 performs countdown processing. The countdown processing is processing of decrementing the remaining number of seconds of the self-timer. Specifically, if 1 second has elapsed from the image capturing start request issued in step S205, or if 1 second has elapsed from the previous countdown processing in step S216, the system control unit 50 decrements the remaining number of seconds of the self-timer by one. For example, if 1 second has elapsed from when the remaining number of seconds of the self-timer is 10 seconds in the previous countdown processing in step S216, the remaining number of seconds of the self-timer is decremented by one, so that the remaining number of seconds of the self-timer becomes 9 seconds.

In step S217, the system control unit 50 determines whether countdown has ended. Specifically, the system control unit 50 determines whether the remaining number of seconds of the self-timer has become 0. If countdown has ended (YES in step S217), the processing proceeds to step S218. On the other hand, if countdown has not ended (NO in step S217), the processing returns to step S207, and the processing in steps S207 to S217 is repeated. Thus, for example, in a case where the user selects 10 seconds as the number of seconds of the self-timer, the remaining number of seconds of the self-timer that is decremented by one every second in order from "10" to "9", "8", and so on is displayed on the display unit 109 as a count display. In addition, if the user selects 2 seconds as the number of seconds of the self-timer, the remaining number of seconds of the self-timer that is decremented by 1 second from "2" to "1" is displayed on the display unit 109 as a count display.

When the processing in steps S207 to S217 is repeated, if an input of the operation unit 118 has been previously received in step S214, and the system control unit 50 displays the count display in the changed size in step S215, the system control unit 50 displays the count display while maintaining the changed size until countdown ends. Alternatively, the system control unit 50 displays the count display while maintaining the changed size until an input of the operation unit 118 is received again.

For example, if the size is changed to the large size, i.e., the first size, in step S215, in the subsequent processing in steps S207 to S217, the processing proceeds to step S212 without proceeding to step S207, S208, S209, S210, or S211 unless an input of the operation unit 118 is received again in step S214. Thus, in step S212, the count display is maintained in the large size, i.e., the first size. By the processing proceeding to steps S214 and to S215, the size of the count display can be changed again to the small size, i.e., the second size.

In addition, for example, if the size is changed to the small size, i.e., the second size, in step S215, in the subsequent processing in steps S207 to S217, the processing proceeds to step S213 without proceeding to step S207, S208, S209, S210, or S211 unless an input of the operation unit 118 is received again in step S214. Thus, in step S213, the count display is maintained in the small size, i.e., the second size. By the processing proceeding to steps S214 and to S215, the size of the count display can be changed again to the large size, i.e., the first size.

In step S218, the system control unit 50 performs a series of image capturing processes starting from the readout of a signal from the imaging unit 103 up to the writing of image data onto the recording medium 130. Thus, if self-timer image capturing is set, image capturing is automatically executed as the remaining number of seconds of the self-timer elapses.

When the processing in steps S207 to S217 is repeated, by selecting the "cancel self-timer image capturing" button 503, 513, or 523 illustrated in FIG. 5A, 5B, or 5C, the system control unit 50 can cancel the countdown processing and end self-timer image capturing. By ending self-timer image capturing halfway if, for example, the user is not ready for image capturing, the user can eliminate the need for waiting until the remaining time elapses, and can prevent an unintended image from being recorded.

As described above, in the present exemplary embodiment, if the set time of the self-timer is equal to or larger than the first predetermined time, the system control unit 50 controls the count display to be displayed in the first size. On the other hand, if the set time of the self-timer is smaller than the first predetermined time, the system control unit 50 controls count display to be displayed in the second size smaller than the first size. In this manner, if the set time of the self-timer is long, a distance between the camera 100 and the subject (user) is assumed to be far. Thus, by displaying the count display in a large size, it becomes easier for the user to check the remaining time until image capturing is executed. On the other hand, if the set time of the self-timer is short, a distance between the camera 100 and the subject (user) is assumed to be short. Thus, by displaying the count display in a small size, it becomes easier to check a live view image. Thus, an appropriate count display can be provided in accordance with the setting of the self-timer.

In addition, in the present exemplary embodiment, if the remaining time of the self-timer becomes equal to or smaller than the second predetermined time when the count display is being displayed in the first size, the system control unit 50 controls the count display to be displayed with a size smaller than the first size. In this manner, by displaying the count display in a smaller size when the remaining time of the self-timer becomes short, it becomes easier to check a live view image.

In the above-described exemplary embodiment, the processing proceeds to step S209 if it is determined in step S210 that the remaining number of seconds of the self-timer becomes equal to or smaller than the second predetermined time, and then the determination result is No in step S209, the count display is displayed in the small size, i.e., the second size, in step S213. Nevertheless, a processing flow is not limited to the processing flow in this case. For example, the processing in step S210 may be omitted such that the processing proceeds to S211 if the determination result in step S210 is YES. In this case, if the set number of seconds of the self-timer is equal to or larger than the first predetermined time, in principle, the count display is displayed in the large size, i.e., the first size, in step S212 irrespective of the remaining time of the self-timer. Thus, with the count display being always displayed in a large size, it becomes easier for the user to check the remaining time until image capturing is executed by viewing the display unit 109 of the camera 100.

In the above-described exemplary embodiment, the description has been given of a case where the number of seconds corresponding to either 2 seconds or 10 seconds is selectable as the number of seconds of the self-timer, but the configuration is not limited thereto. Although the number of seconds of the self-timer is set to 2 seconds, for example, an option for "displaying the count display in the small size, i.e., the second size, only in the case of a self-imaging capturing mode" may be selectable. In this case, even when the number of seconds of the self-timer is set to 2 seconds, the system control unit 50 displays the count display in the large size, i.e., the first size, in a case where the self-image capturing mode is not set. On the other hand, if the self-image capturing mode is set, the system control unit 50 displays the count display in the small size, i.e., the second size. By changing the count display size in this manner, it allows the user to easily check the facial expression of him/herself in the self-image capturing mode in which there is a high demand for checking the facial expression of the user in a live view image.

In addition, in the above-described exemplary embodiment, the description has been given of a case where, if the processing proceeds from step S210 to step S213 and to step S209, the system control unit 50 displays the count display in the small size, i.e., the second size, but the configuration is not limited to the configuration in this case. The system control unit 50 may display the count display with a size other than the second size. For example, the system control unit 50 may display the count display with a size that is other than the second size and is smaller than the first size.

In the above-described exemplary embodiment, the description has been given of a case where, in step S215, the system control unit 50 changes the count display size from the first size to the second size, or from the second size to the first size, and displays the count display in the changed size, but the configuration is not limited thereto. For example, when the system control unit 50 changes the count display size from the first size, the system control unit 50 may display the count display with a size that is other than the second size and is smaller than the first size. In addition, when the system control unit 50 changes the count display size from the second size, the system control unit 50 may display the count display with a size that is other than the first size and is larger than the second size.

In addition, in the above-described exemplary embodiment, the description has been given of a case where, if the count display is displayed in the large size, i.e., the first size, the count display is displayed at the substantially-center position of the screen, and if a count display is displayed in the small size, i.e., the second size, the count display is displayed at the position near the end portion of the screen. The configuration is however not limited to the configuration in this case. For example, if the count display is displayed in the large size, i.e., the first size, the count display may be displayed at a position closer to the center of the screen as compared with a case where the count display is displayed in the small size, i.e., the second size.

In the above-described exemplary embodiment, the description has been given of an example where the count display is displayed at the respective different positions of the screen in a case where the count display is displayed in the large size, i.e., the first size, and in a case where the count display is displayed in the small size, i.e., the second size, but the configuration is not limited to the configuration in this example. For example, the count display may be displayed at the same position (e.g., first position or second position) both in a case where the count display is displayed in the large size, i.e., the first size, and in a case where the count display is displayed in the small size, i.e., the second size.

In addition, the system control unit 50 can detect a subject, such as a person's face, from an image captured by the imaging unit 103, and display the count display at a position not overlapping the detected subject. In this case, the system control unit 50 corresponds to an example of a detection unit that detects a subject from an image captured by the imaging unit 103.

Other Exemplary Embodiment

An exemplary embodiment of the present invention is also implemented by executing the following processing. More specifically, an exemplary embodiment of the present invention is also implemented by executing processing of supplying a program for implementing a function of the above-described exemplary embodiment, to a system or an apparatus via a network or various recording media, and a computer (central processing unit (CPU) or micro processing unit (MPU), etc.) of the system of the apparatus reading out a program code and executing the program code. In this case, the program and a recording medium storing the program are included in the present invention.

Heretofore, various exemplary embodiments of the present invention have been described, but the present invention is not limited only to these exemplary embodiments. Changes can be made within the scope of the present invention, and the above-described exemplary embodiments may be appropriately combined.

The above-described various types of control described as being performed by the system control unit 50 may be performed by one piece of hardware. Alternatively, by sharing processing, a plurality of pieces of hardware (e.g., a plurality of processors or circuits) may control the entire apparatus.

In addition, in the above-described exemplary embodiment, the description has been given of a case where the present invention is applied to an imaging control apparatus (camera), but the application of the present invention is not limited thereto. The present invention can be applied to any apparatus as long as the apparatus can display count display of a self-timer. In addition, the present invention is desirably applied to an apparatus in which an image capturing direction and a display direction of a display unit are the same. More specifically, the present invention can be applied to a smartphone, a tablet PC, a portable personal computer, or a personal digital assistance (PDA). In addition, in a case of an apparatus is equipped with two or more types of cameras having different image capturing directions, when an image is being captured by a camera having the same image capturing direction as a display direction of a display unit, the count display size is changed in accordance with the setting of a self-timer. On the other hand, when an image is being captured by a camera having a different image capturing direction from the display direction of the display unit, count display may be displayed in a uniform size irrespective of the setting of the self-timer.

In addition, in the above-described exemplary embodiment, the description has been given of a case where the present invention is applied to an imaging apparatus main body (camera main body), but the application of the present invention is not limited to this case. The present invention can also be applied to a control apparatus that remotely controls an imaging apparatus (including a network camera) by communicating with the imaging apparatus via wired or wireless communication. Examples of the control apparatus that remotely controls an imaging apparatus include a smartphone, a tablet PC, and a desktop PC. The control apparatus can remotely control the imaging apparatus by notifying the imaging apparatus of commands for causing the imaging apparatus to perform various operations and settings, based on an operation performed by the control apparatus or processing performed by the control apparatus. In addition, the control apparatus may be enabled to receive a live view image captured by the imaging apparatus, via wireless or wired communication, and display the live view image.

According to the present invention, a count display can be appropriately displayed in accordance with a setting of a self-timer.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-192912, filed Oct. 23, 2019, which is hereby incorporated by reference herein in its entirety.

What is claimed is:

1. An imaging control apparatus comprising:

a setting unit configured to set a time of a self-timer;

a control unit configured to control image capturing to be performed upon a lapse of the time set by the setting unit from when an image capturing instruction is issued; and a display control unit configured to control a count display to be displayed with a first size in a case where the time set by the setting unit is equal to or larger than a first predetermined time, and to control the count display to be displayed with a second size smaller than the first size in a case where the time set by the setting unit is smaller than the first predetermined time.

2. The imaging control apparatus according to claim 1, wherein the display control unit controls the count display to be displayed with a size smaller than the first size in a case where a remaining time of the self-timer becomes equal to or smaller than a second predetermined time when the count display is being displayed in the first size.

3. The imaging control apparatus according to claim 1, wherein the display control unit controls the count display to be displayed at respectively different positions of a screen in a case were the count display is displayed with the first size and in a case where the count display is displayed in the second size.

4. The imaging control apparatus according to claim 3, wherein, in a case where the count display is displayed with the first size, the display control unit displays the count display at a position closer to a center of a screen than a position in a case where the count display is displayed with the second size.

5. The imaging control apparatus according to claim 1, further comprising a size setting unit configured to set a size with which the count display is displayed, wherein, in a case where the size is set by the size setting unit, the display control unit controls the count display to be displayed in the size set by the size setting unit, irrespective of the time set by the setting unit.

6. The imaging control apparatus according to claim 1, further comprising a transmission setting unit configured to set live streaming image capturing for transmitting an image captured by an imaging unit, to an exterior, wherein, in a case where the live streaming image capturing is set by the transmission setting unit, the display control unit controls the count display to be displayed with the first size, irrespective of the time set by the setting unit.

7. The imaging control apparatus according to claim 1, further comprising a reception unit configured to receive an operation from a user, wherein, in a case where an operation from a user is received by the reception unit when the count display is being displayed with the first size, the display control unit controls the count display to be displayed with a size changed to be smaller than the first size.

8. The imaging control apparatus according to claim 1, further comprising a reception unit configured to receive an operation from a user, wherein, in a case where an operation from a user is received by the reception unit when the count display is being displayed with the second size, the display control unit controls the count display to be displayed with a size changed to be larger than the second size.

9. The imaging control apparatus according to claim 7, wherein the display control unit controls the count display to be displayed with the changed size until the count display ends.

10. The imaging control apparatus according to claim 1, further comprising a detection unit configured to detect a subject from an image captured by an imaging unit, wherein the display control unit controls the count display to be displayed at a position not overlapping the subject detected by the detection unit.

11. A control method of an imaging control apparatus, the control method comprising:

setting a time of a self-timer;

controlling image capturing to be performed upon a lapse of the set time from when an image capturing instruction is issued; and controlling a count display to be displayed with a first size in a case where the set time is equal to or larger than a first predetermined time, and controlling a count display to be displayed with a second size smaller than the first size in a case where the set time is smaller than the first predetermined time.

12. A non-transitory computer-readable storage medium storing a program for causing a computer to execute a control method, the control method comprising:

setting a time of a self-timer;

controlling image capturing to be performed upon a lapse of the set time from when an image capturing instruction is issued; and controlling a count display to be displayed with a first size in a case where the set time is equal to or larger than a first predetermined time, and controlling a count display to be displayed with a second size smaller than the first size in a case where the set time is smaller than the first predetermined time.

* * * * *